Dec. 3, 1940.                E. A. STALKER                2,223,745
                            TORQUE CONVERTER
                        Filed April 27, 1938        4 Sheets-Sheet 1

Dec. 3, 1940.        E. A. STALKER        2,223,745
                     TORQUE CONVERTER
           Filed April 27, 1938       4 Sheets-Sheet 2

INVENTOR
Edward A. Stalker

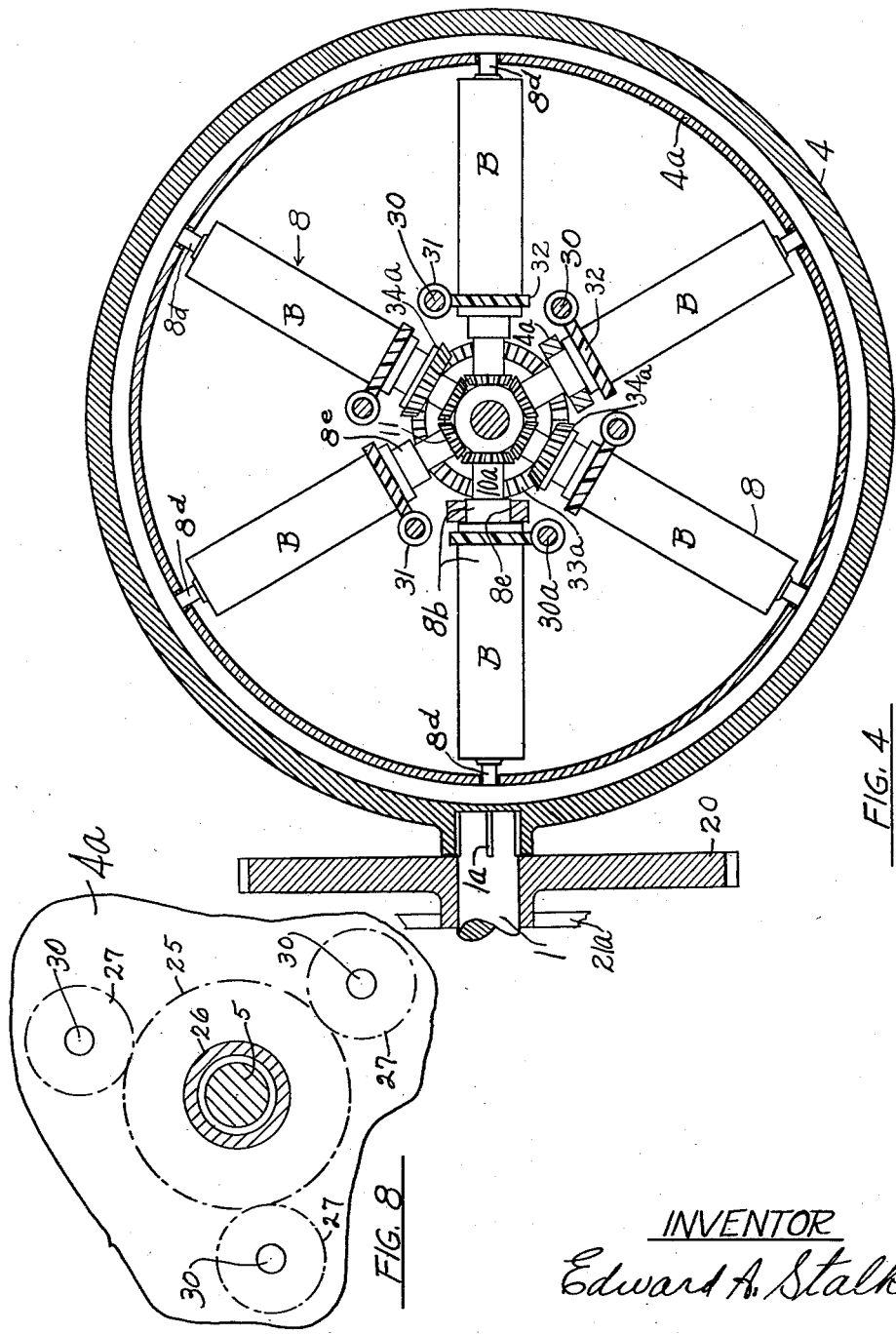

Dec. 3, 1940.  E. A. STALKER  2,223,745
TORQUE CONVERTER
Filed April 27, 1938  4 Sheets-Sheet 4
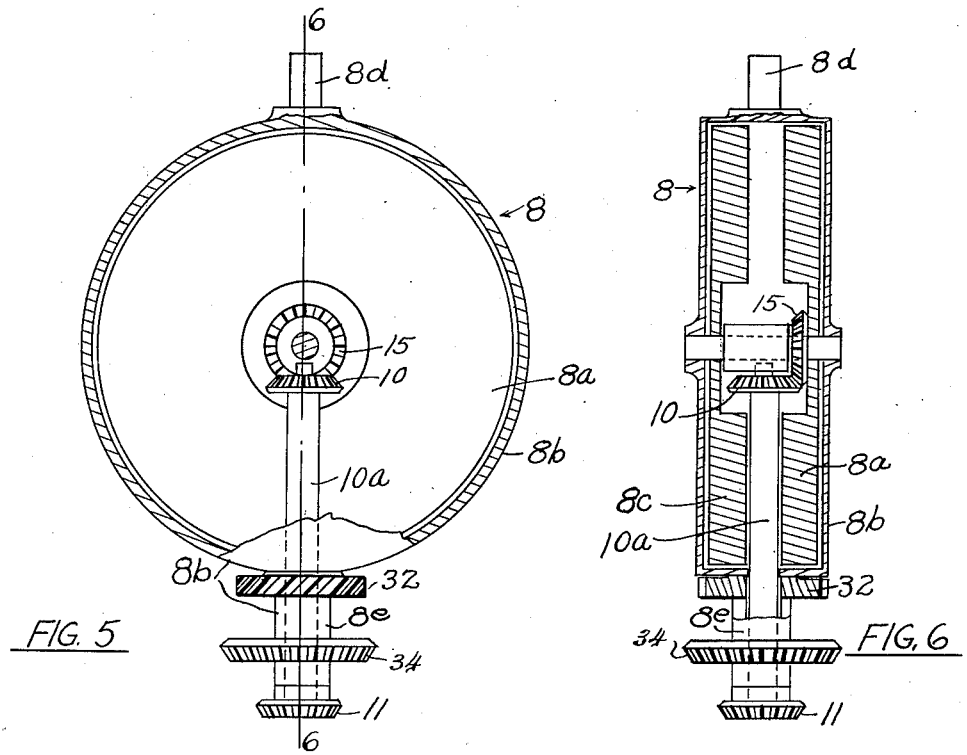
FIG. 5
FIG. 6
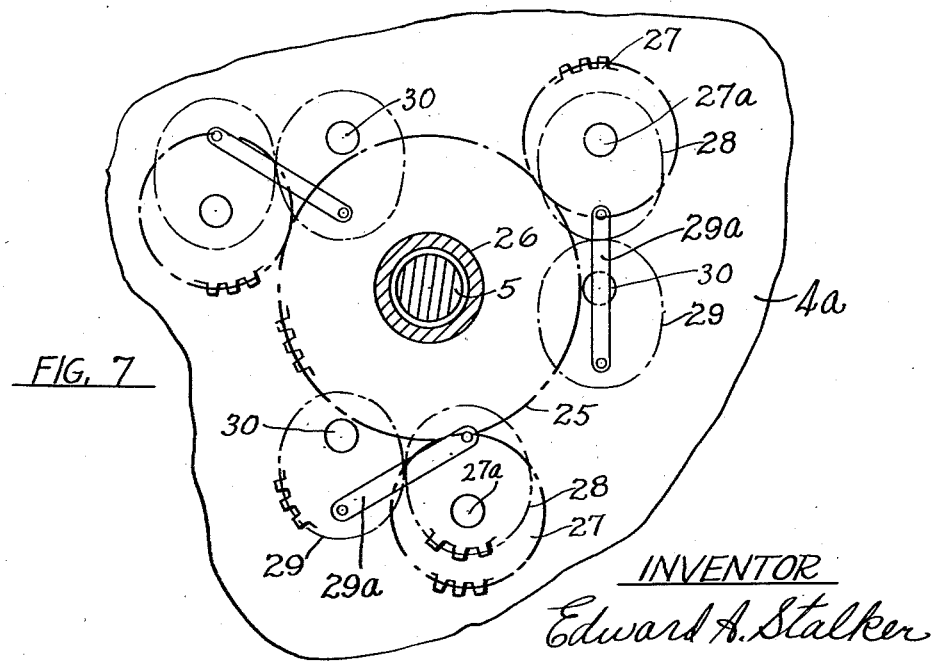
FIG. 7
INVENTOR
Edward A. Stalker Patented Dec. 3, 1940

2,223,745

UNITED STATES PATENT OFFICE 2,223,745

TORQUE CONVERTER

Edward A. Stalker, Ann Arbor, Mich.

Application April 27, 1938, Serial No. 204,488

3 Claims. (Cl. 74—5)

This invention relates to a gyroscopic torque converter and has for its object the provision of an effective and efficient means of converting a given torque and angular velocity to a different torque and angular velocity. It is related to the previous applications Serial No. 136,437 and Serial No. 175,866.

In the present application the gyroscopes are controlled about axes which are perpendicular to the axis of precession whereas in the first application mentioned above the control axes are parallel to the axis of precession. The present application also differs from the second one mentioned in that the gyroscopes are rotatable through a complete turn about the control axis if desired. Also the gyroscopic rotors are rigid bodies.

I accomplish the above object by the mechanism illustrated in the accompanying drawings in which—

Figure 3 is a fragmentary section along line 3—3 in Figures 1 and 2;

Figure 4 is a fragmentary section taken along line 4—4 in Figure 2;

Figure 5 is a fragmentary section of a gyroscope;

Figure 6 is a section along line 6—6 in Figure 5;

Figure 7 is a fragmentary section along line 7—7 in Figure 2 to show the elliptic gear arrangements; and Figure 8 depicts a mechanism of circular gears only, which can be substituted for the mechanism of Figure 7.

Figure 1:
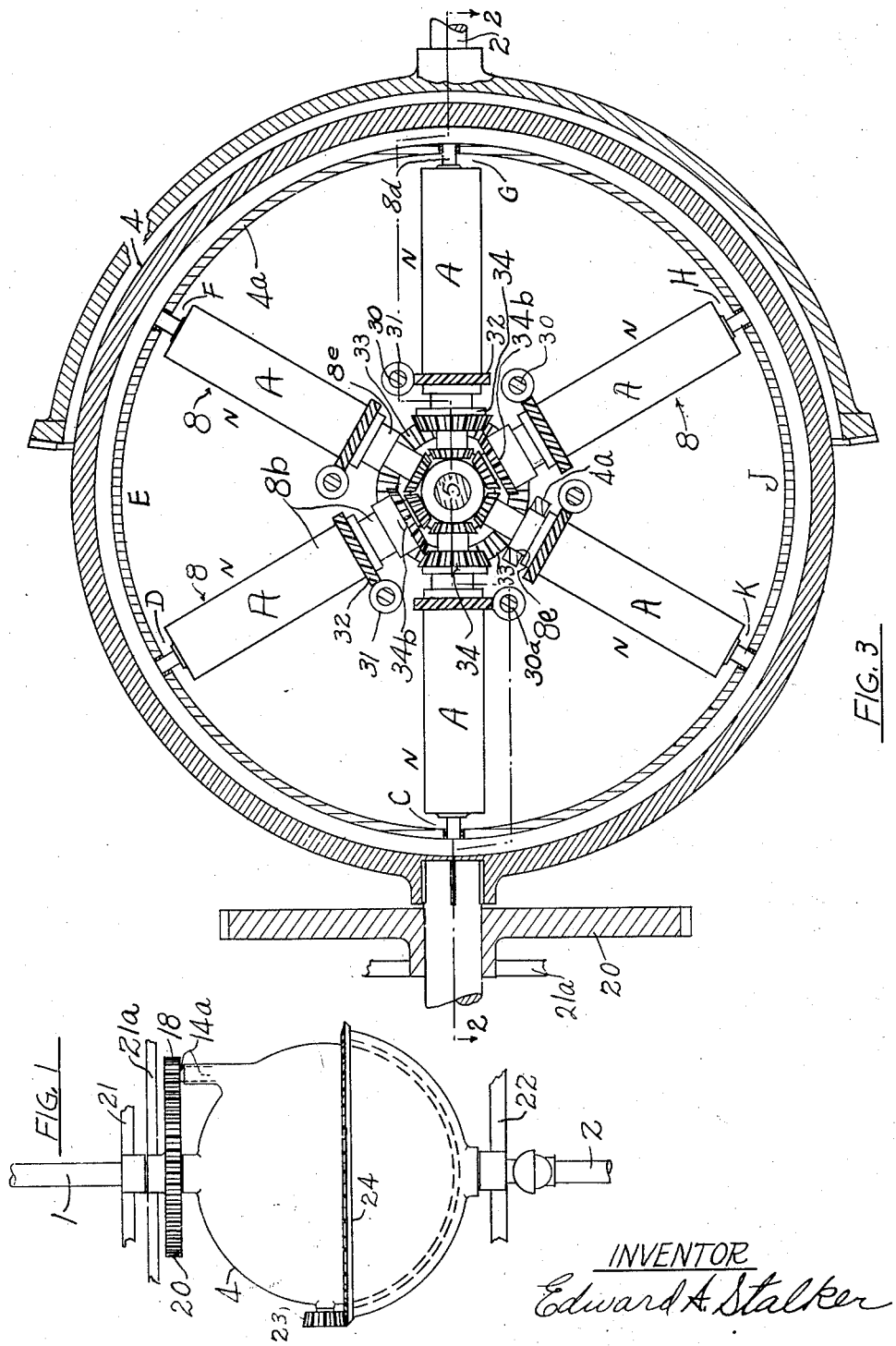
Figure 1 is a side elevation of the torque converter.

Referring to Figures 1, 2, 3, and 4, and particularly to 2, the drive shaft is 1, and the driven shaft is 2. The two shafts have a gyroscopic mechanism relating them so that the torque of shaft 1 is convertible to a torque of shaft 2 of different value. The rates of rotation of shafts 1 and 2 are then necessarily different since the power transmitted remains constant.

At the end of shaft 1 the spherical shell 4 is rigidly attached by splines 1a. The splines 3 fix the shell 24 to the driven shaft 2. Through its diameter and at right angles to the shaft 1 is the shaft 5 carried at one end in the bearing 7 and at the other end in the bearing 6 formed in the shell 4.

Mounted on the shaft 5 are twelve gyroscopes 8 composed of the spinning elements or rotors 8a and 8c and supporting frame 8b. The frame is rotatably supported on a stub shaft 8d in the shell 4a, and in its arm at 8e. The bearings at 8e for all the gyroscopes are not shown in Figures 3 and 4 for the sake of clarity in the drawings.

As shown in Figures 2, 3, 5, and 6 particularly the gyroscopic rotors are spun by the gear train 10, 11, 12, 13, 14, 15. The gear 10 engages with the gear 15 attached to the rotors. The shaft 10a is rotatably borne in frame 8b. The frame is prevented from rotating under the action of the torque from gear 10 by helical gears 31 and 32, the latter fixed to the housing 8b. The method of controlling them will be described subsequently. The gears 31 are fixed on shaft 30 supported in bearings 16 and 17 formed in frame 4a.

Suitable collars and shoulders restrain all the shafts against endwise displacement as would be readily understood by those skilled in the art of mechanics.

Rotation of the gear train is accomplished through gear 13 fixed to the hollow shaft or sleeve 19. The latter fits rotatably over the shaft 5 and carries fixed to it the gears 12. A gear 18 is fixed to shaft 14a and rolls about the gear 20 which is stationary, being restrained by the supports 21. When shaft 1 and the shell 4 are rotated gear 18 is spun, and because of the high ratio of the gear train, the rotors are spun very rapidly.

Figure 2:
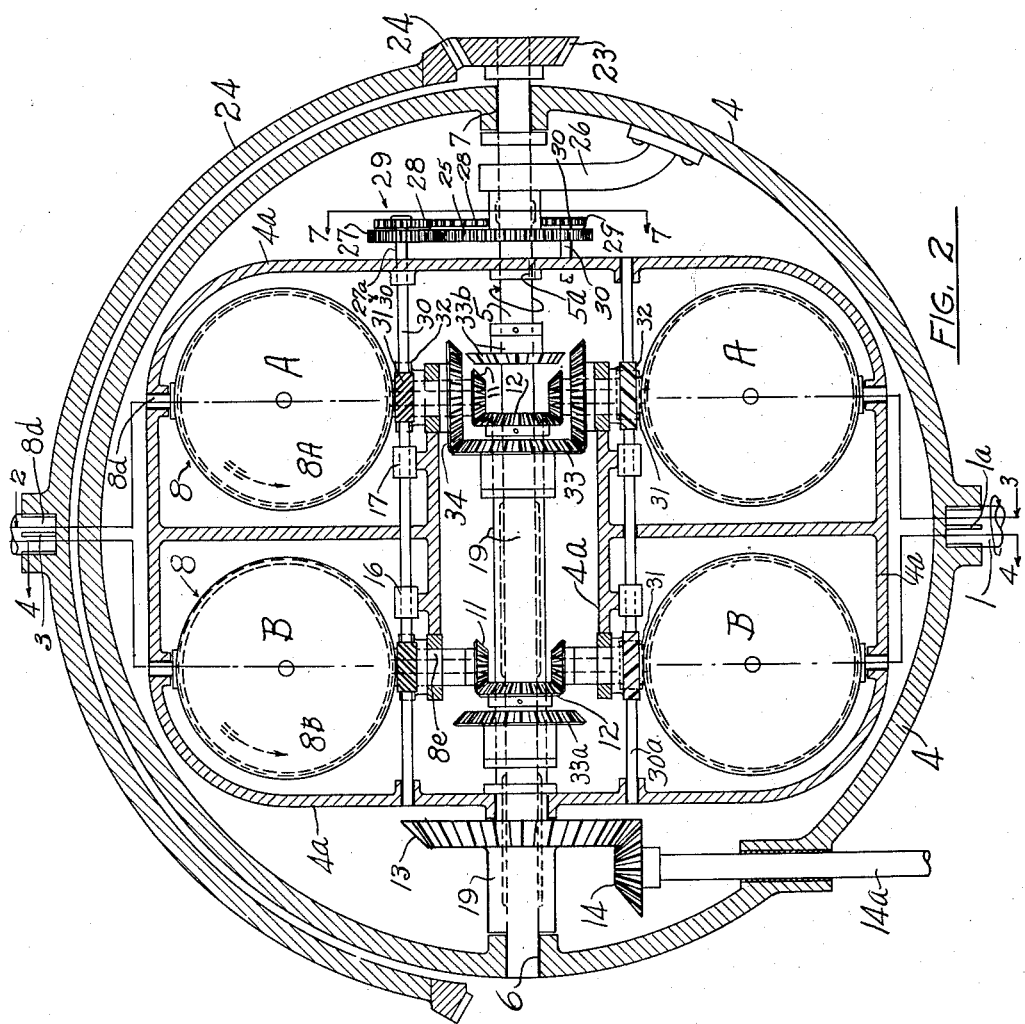
Figure 2 is a fragmentary section taken along line 2—2 of Figure 3.

The rotation of shaft 5 about the axis of 1 both spins and rotates the gyroscopes and according to gyroscopic theory there will arise a gyroscopic torque which is transmitted to the shaft 5 through the stub shaft 8d and frame 4a keyed to the shaft 5 at 5a. This torque is in such a direction that shaft 5 and gear 23 carried thereon tend to rotate as indicated in Figure 2. The direction of spin of the gyroscopes is also indicated in this figure.

It will now be apparent that due to the torque of gear 23 the gear 24 rigidly attached to shaft 2 by splines 2a will be turned. The magnitude of the gyroscopic or precessional torque about shaft 5 will determine the torque of shaft 2.

The torque converter is supported on the supports 21 and 22.

It is to be noted, if the gyroscopes rotate about the precessional axis (axis of shaft 5), that after a 180-degree turn the precessional torque is reversed in direction for the same direction of rotation about the axis of 1, the torque input axis. If after a 180-degree turn the gyroscope is also inverted, the direction of the torque will be in the same direction as at the beginning of the 180-degree turn.

This inversion of the gyroscopes should be made when the axis of spin is parallel to the axis of shaft 1, that is, when the gyroscopes are at the top and bottom of the Figure 3. The control axis is then approximately vertical.

The inversion of the gyroscopes is accomplished by a train of gears including two elliptic gears. A gear 25 (Figures 2 and 7) is fixed to the shell 4 by the bracket 26. Meshing with this gear is another spur gear 27 of half the diameter. This gear is carried on the shaft 27a which also has fixed to it the elliptic gear 28. Another elliptic gear 29 meshes with the first and is fixed to the shaft 30 which carries the spiral gears 31 each in mesh with spirals 32 fixed to the housings 8b of the gyroscopes. See Figures 5 and 6.

There are three separate elliptic gear trains of two each as shown in Figure 7.

When the gyroscopes rotate with shaft 5 about the axis of 5 the elliptic gears are rotated twice as fast and so present a high angular ratio between shaft 5 and shaft 30 each 180 degrees of rotation. However, the gyroscopes are turned about the control axis (axis of shafts 10a and 8d) only once each 180 degrees because the ratio of gear 31 to gear 32 is 1 to 2.

Actually the gyroscopes are being rotated slightly about the control axis at all times but the rate is very small at all localities except when the spin axes are near to parallelism with axis 1.

This is accomplished by the variable angular velocity ratio available from elliptic gears.

I prefer elliptic gears with ratios of axes approximately 1.25 to 1 in which case there is a rotation of about 15 degrees only, until the gyroscopes approach the top and bottom positions within about 30 degrees. Then in about the next 60 degrees of rotation about the axis 5 the gyroscopes are inverted.

The elliptic gears function best when two of the foci are connected by a link 29a, Figure 7.

Attached to the housings 8b are bevel gears 34 and 34a freely rotatable on shaft 10a. These bevel gears in cooperation with gears 33 and 33a serve to transfer the control movements to the oppositely located gyroscopes so that the elliptic gear train need not be duplicated for each gyroscope. By employing bevel gears 33 and 33a at both gyroscope assemblies A and B to control independent pairs of gyroscopes as many as eight gyroscopes can be controlled conveniently with a gear 34 for each of eight gyroscopes. Thus in one radial plane CG (through the axis of shaft 5) a gyroscope at the right group A (Figures 2 and 3) has a gear 34 and controls its mate across the shaft 5 through gear 33, but in the next radial plane FK (Figure 3) the gear 34 is fitted to the gyroscope in the B group (Figure 2) and it controls its mate on the opposite side of shaft 5 through gear 33a. The shaft 30a and helical gears transmit the control movement from a gyroscope in group B to another in group A. For instance in Figure 2 the gyroscopes 8A and 8B are controlled by shaft 30 and the control is extended to the other two gyroscopes by the gear 33 and shaft 30a. In still another radial plane DH, the bevel gear 33b operates between gears 34b of the gyroscopes in the A group and there no gears 34 in the B group in this same radial plane. Compare Figures 3 and 4. All the gears 33, 33a and 33b are free on their shafts except for collars which restrain them endwise.

It is to be observed that the rotation of a gyroscope takes place about an axis (the control axis) extending out radially from the axis of precession, axis of shaft 5, and so the rotation of the axis of spin is in a plane parallel to the axis of shaft 5. In the previous applications the control axis is always parallel to the axis of 5 when the gyroscope can be turned through 180 degrees or more.

To produce a precessional torque the axis of spin must be transverse to the torque input axis and the greatest torque occurs when these are perpendicular. It is only for the most lateral positions of the gyroscopes that the spin and torque input axes are perpendicular.

In the previous application Serial No. 175,866 all the power transmitted by the gyroscopes went through the gear trains which controlled the attitudes of the gyroscopes. In the present application the gyroscopic torque (precessional torque) is applied directly to the shaft 5 by means of the frame 4a.

The direction of rotation of the gyroscopes about the control axis is such that no net torque due to the inversion is brought into opposition with the torque precessing the gyroscopes about the axis of shaft 5.

By arranging the gyroscopes with their rotors spinning in planes extending approximately radially from the precessional axis a large number of gyroscopes can be employed when the axis of spin is normally extensive radially from the precessional axis. This arrangement is one of the features of this invention.

The gyroscopes in groups A and B are rotated in opposite directions about their control axes as indicated by the different pitches of the helical gears 32. This mode of operation is not essential but it relieves the shafts 30 and 30a of end load as well as torque load.

As shown in Figure 8 the elliptic gears may be dispensed with and the gears 27 mounted directly upon shafts 30. The torque output of the converter then will not be as high as it would be with the elliptic gears but the loads on the gear teeth due to the high accelerations with the elliptic gears will be absent. This is an advantage from the point of view of wear and reliability. However I consider the device with elliptical gears incorporated as the preferred form.

I call the axis of shaft 1 the torque input axis, the axis of shaft 5 the precessional axis, that of shaft 2 the torque output axis. The control axis extends along shaft 8d and shaft 10a. The spin axis is the axis of rotation or spin of the gyroscopic rotors. Shaft 2 is a driven member as is also shaft 5.

In Figure 3 the attitudes of the axis of spin has been marked to indicate how the gyroscopes are inverted. At locality C the end N of the gyroscope is up and the axis is vertical. See also Figure 6. At locality D the end N is still up but the axis is inclined slightly (but not shown) to the plane of the paper. At E the end N would begin to point downward except that the gyroscope is now rapidly turned through 180 degrees about the control axis. Thus at F and G the end N is still up. As a result of this inversion the precessional torque retains the same direction of action. At the lower locality J the gyroscopes are again inverted to preserve the unidirectional torque for the full turn about axis 5.

The device is suitable for internal combustion engines, particularly for the automobile and other vehicles similarly propelled. It is also suitable as a speed reducer and a coupling. It may be of any size.

While I have illustrated specific forms of the invention it is to be understood that I do not intend to limit myself to these exact forms but intend to claim my invention broadly as defined by the appended claims.

I claim:

1. In combination, a driving member, a driven member, a gyroscopic mass, means including said driving member for mounting said mass for simultaneous rotations about a control axis and three mutually transverse axes namely a torque input axis, a spin axis, a precessional axis, said control axis being transverse to said spin axis, means for imparting a spin to said mass about the spin axis and means including elliptical gears to rotate the mass about the said control axis through a complete turn thereabout in controlled relation to the rotation of said mass about the precessional axis to provide a unidirectional precessional torque, said means for mounting being adapted for the application of the precessional torque to the driven member.

2. In combination, a driving member, a driven member, a plurality of gyroscopic masses, means including said driving member for mounting each said mass for rotation about a control axis and for simultaneous rotations about three mutually transverse axes namely a torque input axis, a precessional axis and a spin axis, means to impart spins to said masses about their respective spin axes, and means to rotate a pair of masses in opposite directions about their respective control axes through complete turns thereabout in controlled relation to the rotation of said mass about the precessional axis to provide a unidirectional precessional torque, said means for mounting providing for the application of the precessional torque to the driven member.

3. In combination, a driving member, a driven member, a plurality of gyroscopic masses, means including said driving member for mounting each said mass for rotation about a control axis and for simultaneous rotations about three mutually transverse axes namely a torque input axis, a precessional axis and a spin axis, means to impart spins to said masses about their respective spin axes, and means to rotate a pair of masses in opposite directions about their respective control axes through complete turns thereabout in controlled relation to the rotation of said mass about the precessional axis to provide a unidirectional precessional torque, said control axis being transverse to said spin axis for each mass.

EDWARD A. STALKER.